Dec. 11, 1934.  K. SIEG  1,984,043
CUT-OFF MECHANISM
Filed Feb. 15, 1934  3 Sheets-Sheet 1
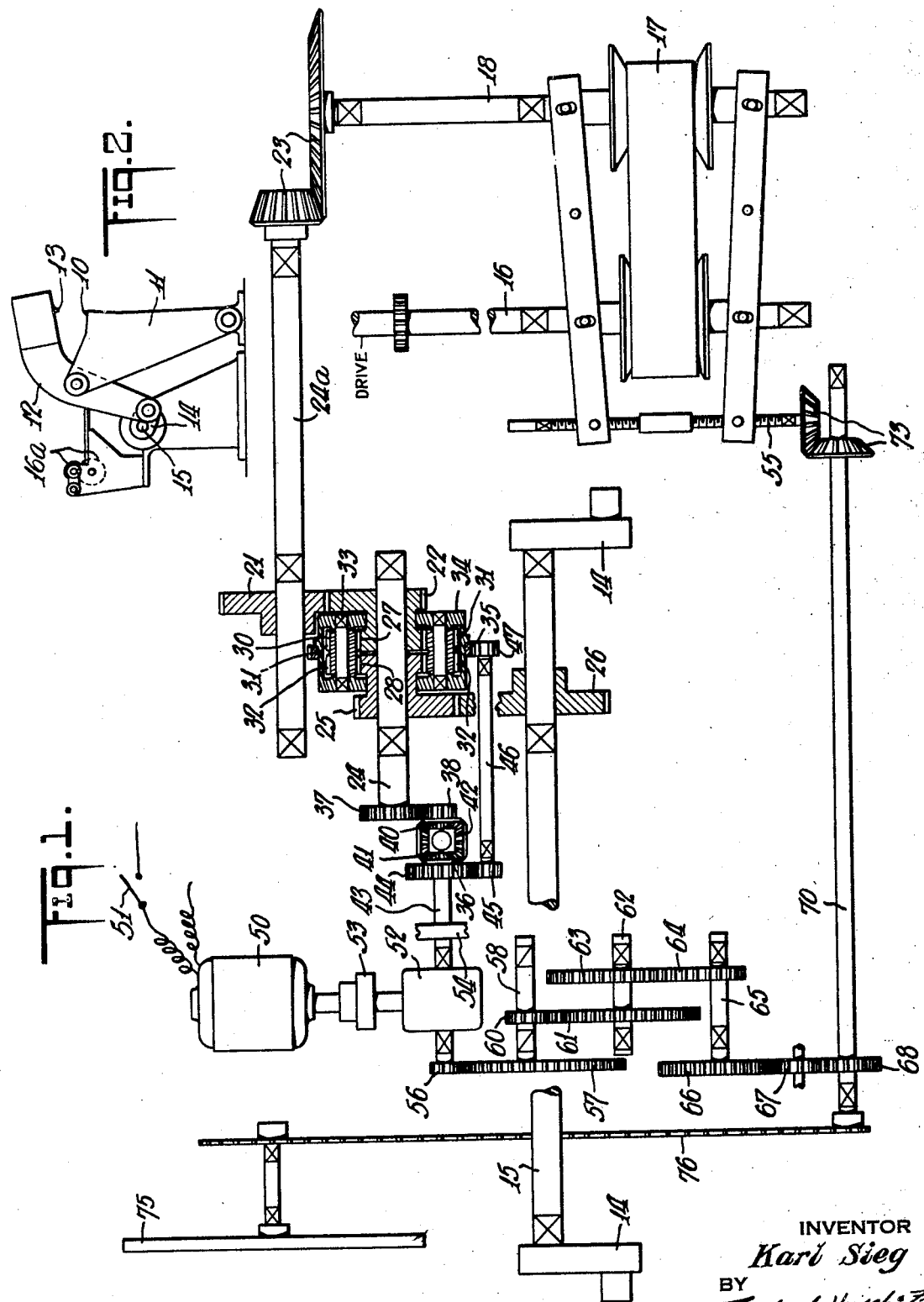
INVENTOR
Karl Sieg
BY
ATTORNEYS

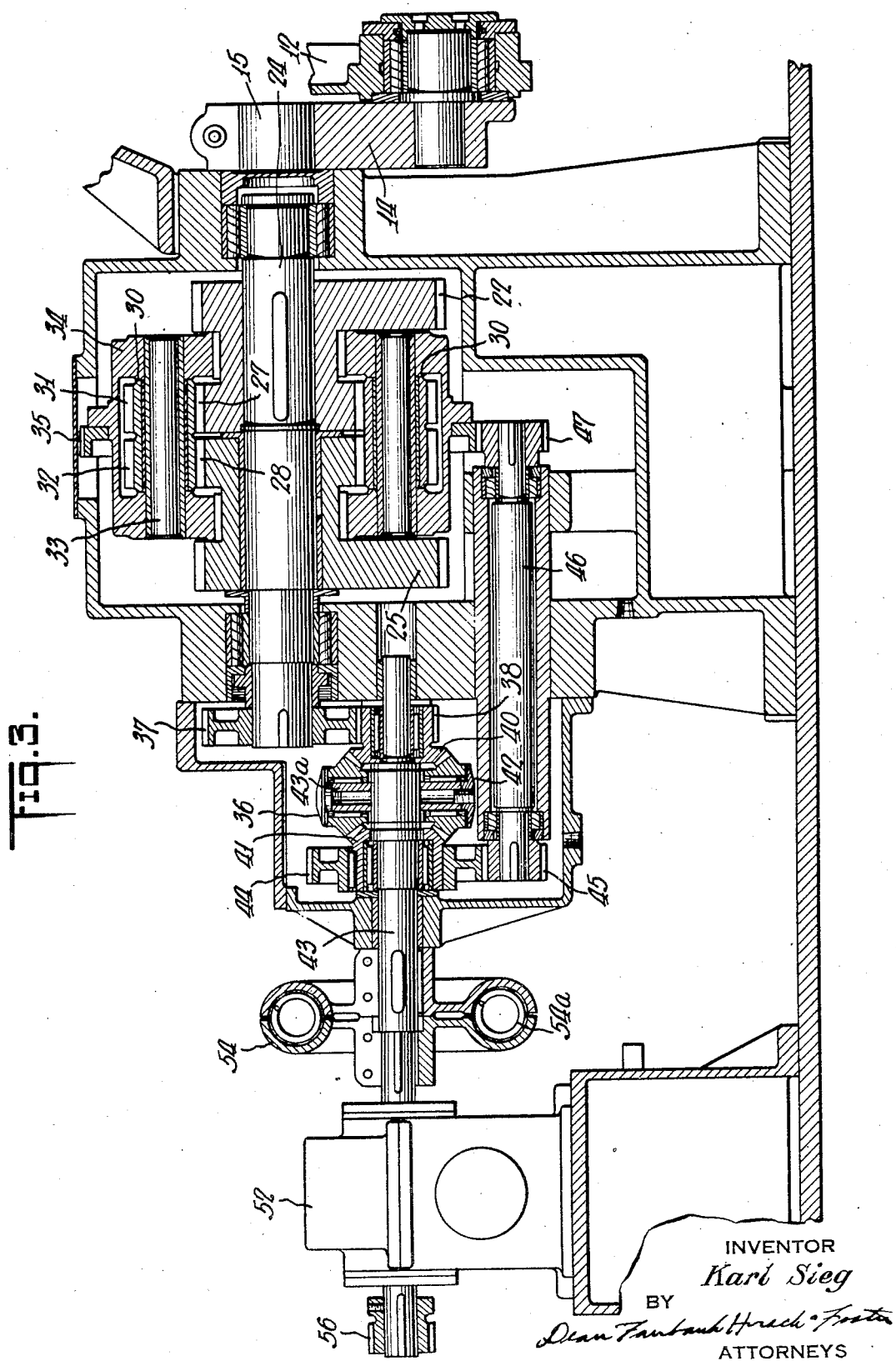

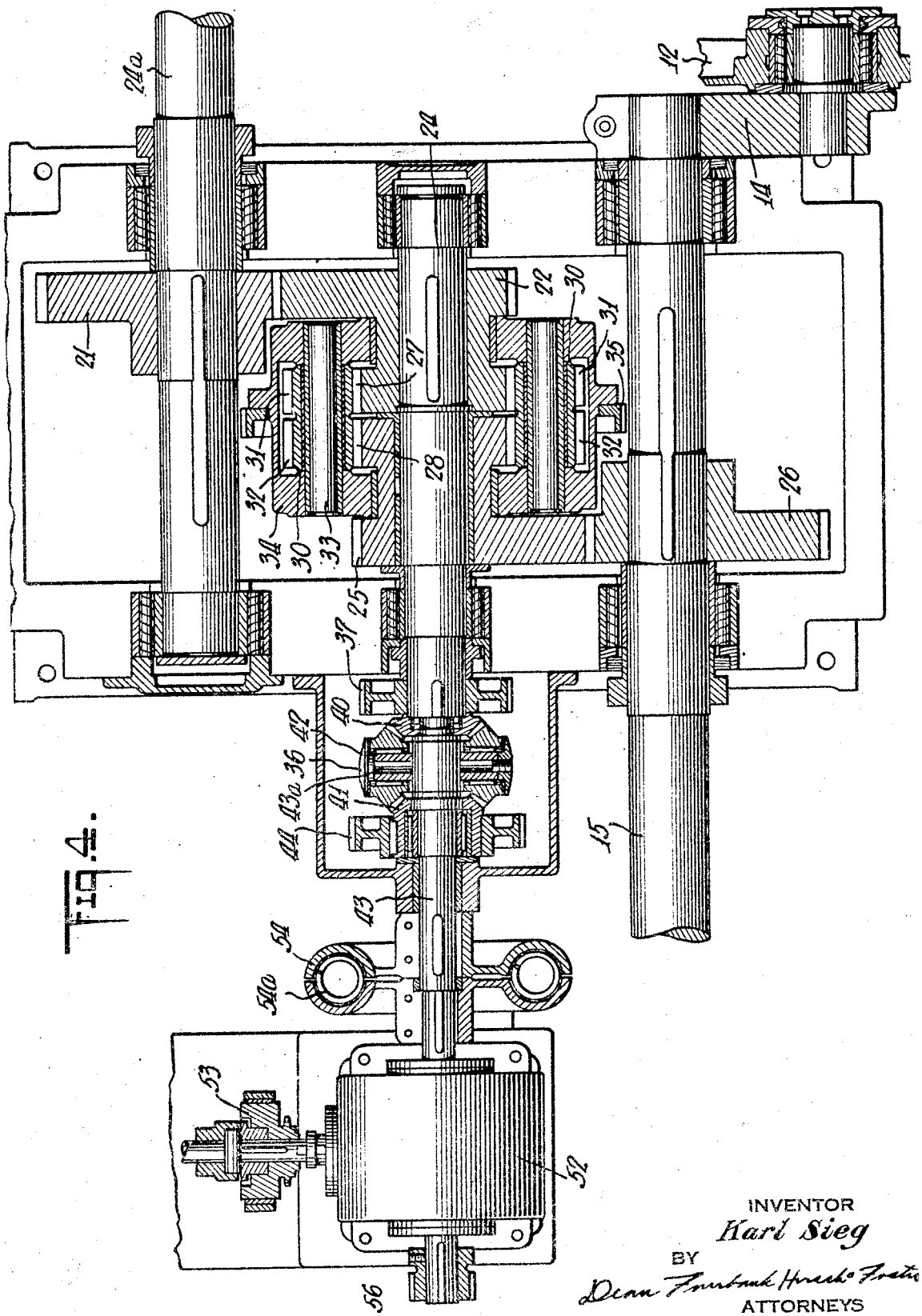

Patented Dec. 11, 1934

1,984,043

UNITED STATES PATENT OFFICE 1,984,043

CUT-OFF MECHANISM

Karl Sieg, Philadelphia, Pa., assignor to Samuel M. Langston Co., a corporation of New Jersey Application February 15, 1934, Serial No. 711,342

21 Claims. (Cl. 164—49)

In my prior Patent No. 1,897,867, issued February 14, 1933, I have shown a cut-off mechanism of the traveling cutter or flying shear type, and in which the proper speed of the cutter in respect to the speed of travel of the material to be cut may be maintained by the operation of a novel combination of elliptical gears and a controllable differential.

The present invention, in the form hereinafter described, is particularly designed for use in the type of machine referred to in said patent.

If the usual type of differential be employed, a small movement of the bodily movable gear of the differential causes a comparatively large adjustment. Furthermore, in the ordinary differential, the input and output shafts thereof normally rotate in opposite directions.

One object of the present invention is to provide a new and improved controlling and driving means for the cut-off mechanism which can be operated to effect very fine adjustments in the lengths of the sections to be cut from the continuously advancing material.

As a feature of the present invention, I provide a driving element and a driven element coaxially mounted and interconnected by a differential which locks the two elements for rotation together during normal operations, and which can be operated to effect changes in the speed ratio or relative angular relationship of these elements.

As another feature, I provide a second differential for selectively changing the speed ratio of said locking differential, said second differential being normally operated at a predetermined speed ratio to cause the first differential to operate as a locking member. The locking differential is so constructed and the means for operating it is so arranged that the bodily movable gear of said locking differential must rotate about its own axis through a large angle to effect comparatively small adjustments between the driving and driven elements, thereby permitting extreme selectivity.

In the accompanying drawings, there is shown for the purpose of illustration, one form of mechanism embodying the present invention. In these drawings:

Fig. 1 is a diagrammatic representation of my improved controlling and power transmitting mechanism as used with a cut-off mechanism for cutting continuously traveling sheet material into sections.

Fig. 2 is a diagrammatic view of one type of cutter which can be operated by means of my improved controlling and driving mechanism.

Fig. 3 is a vertical section through a controlling and driving mechanism embodying my present invention, and showing a portion in side view, and Fig. 4 is a horizontal section of the mechanism of Fig. 3 with a portion thereof in plan view.

My present invention may be used as a part of the drive of a cut-off mechanism or flying shears of any suitable type in which the knives travel in the direction of travel of the sheet at the instant of cutting. The type herein shown is that disclosed and claimed in the Langston U. S. Patent No. 1,359,072. In this type of cut-off mechanism there is provided a knife or cutter member 10 connected between a pair of upstanding arms 11 pivotally mounted at their lower ends, and having pivotal connections respectively with a pair of levers 12 carrying therebetween a knife or cutter member 13 cooperating with the knife 10. These levers 12 are operated by cranks 14 driven from a crank shaft 15. As the shaft 15 rotates, the knife 10 moves back and forth in the direction of travel of a traveling sheet, while the knife 13 has a corresponding back and forth movement as well as a vertical movement. Feeding mechanism 16a is driven from a drive shaft 16 which also serves to drive the shaft 15 through mechanism embodying the main features of my invention.

In order to vary the length of sections being cut without varying the feeding of the sheet material, the transmission between the drive shaft 16 and the shaft 15 includes a variable speed transmission 17 having the shaft 16 as an input shaft, and having an output shaft 18. This variable speed transmission 17 may be of any ordinary type, for instance that known in the trade as a P. I. V. or a Reeves drive, or may constitute a speed change device of the gear type.

Between the variable speed transmission 17 and the crank shaft 15 is my new and improved controlling and power transmitting mechanism for varying the speed of the crank shaft 15 during each of its cycles of operation so that at the time of cutting the knives will travel at the same speed as the material to be cut. In the form shown, said mechanism includes two pairs of elliptical gears 21,22 and 25,26 operated in series. The gear 21 is on a shaft 24a driven from the variable speed transmission 17 for instance through gears 23. The gear 22 meshes with gear 21 and is coaxial with the gear 25 of the other pair. The gear 26 of the second pair is keyed to the cutter shaft 15. The two gears 22 and 25 are on a counter shaft 24, one of the gears, preferably the gear 25, being rotatable on the counter shaft, and the other, preferably the gear 22, is keyed or otherwise fixed thereto. In some constructions, one pair of elliptical gears may be replaced by a pair of circular spur or bevel gears or other corresponding elements.

The means for driving the elliptical gear 25 from the coaxial elliptical gear 22 includes a differential which is normally operated to lock these elliptical gears for rotation together. This differential in the form shown includes a pair of sun gears 27 and 28 integral or otherwise fixed to the elliptical gears 22 and 25 respectively. Meshing with said gears 27 and 28 are one or more planet gear wheels 30, two of such gear wheels being shown as mounted on shafts 33 journaled in a gear housing or carrier 34, and diametrically opposed with respect to the shaft 24. Each gear wheel 30 may comprise a single gear meshing with both the sun gears 27 and 28, or may comprise two gears 31 and 32 integral or otherwise connected together and meshing respectively with the sun gears 27 and 28.

As one important feature, the gear ratio of the gears 27, 31 is slightly different from the gear ratio of the gears 28, 32. The gears 27, 28 may differ by one or more teeth and the gears 31, 32 be the same, or the gears 27, 28 may be the same and the gears 31, 32 differ by one or more teeth, or both pairs may be different so long as the gear ratios are different.

The casing 34 has end walls supporting the shafts 33 and having their inner edges journaled on the hubs connecting the elliptical gears 22 and 25 to the sun gears 27, 28 respectively. The casing is rotatable about the axes of these gears and the shaft 24. For rotating it, the housing 34 has fixed thereto a ring gear 35. In the particular embodiment illustrated, this ring gear 35 is normally driven at an angular velocity equal to the angular velocity of the sun gear 27, and therefore the planet gears 31, 32 are locked against rotation about their axes. The speed of the ring gear may be increased or decreased in respect to the angular velocity of the sun gears, and because of the difference in the gear ratios of gears 27, 31 and gears 28, 32, a slight relative rotation of gears 27 and 28 will be effected. As shown, the ring gear 35 is driven from the shaft 24 through a transmission which includes a second differential 36. This transmission includes a gear 37 fixed to the shaft 24 and meshing with a gear 38 connected to a bevel gear 40 forming part of the differential 36. The differential 36 also includes a bevel gear 41 aligned with the bevel gear 40 on a shaft 43, and driven from the gear 40 through a bevel pinion 42 which is carried by a stub shaft 43a extending radially from and rigid with the shaft 43. The bevel gear 41 is connected to a spur gear 44 meshing with a pinion 45 connected to a shaft 46 on which is also mounted a pinion 47 meshing with the ring gear 35.

The transmission between the shaft 24 and the ring gear 35 is such that if the shaft 43 is stationary, the ring gear will be driven at an angular velocity equal to the angular velocity of the gear 27, causing a corresponding bodily movement of the planetary gears 31 and 32 about the sun gears 27 and 28, so that the planetary gears will not rotate about their own axes, but will lock the two sun gears 27 and 28 against relative rotation.

If the shaft 43 be rotated, then the bevel pinions 40, 41 will not rotate at the same speed, and the ring gear 35 will be accelerated or decelerated in respect to the gear 27. Thus, the angular position or the angular speed of the elliptical gear 25 with respect to the elliptical gear 22 will be changed. Such angular change will be very small because if the gears 27 and 28 differ by only one tooth and the gears 31, 32 have the same number of teeth, one complete revolution of the ring gear 35 in respect to the gear 27 will advance or retard the gear 28 through an angular distance equal to the width of one tooth, and the elliptical gear 25 will be correspondingly adjusted in respect to the elliptical gear 22. In the embodiment shown, the shaft 43 is normally stationary as is also the axis of the pinion 42.

Any suitable means may be provided to effect variations in the rotation of the gear 35, and thereby cause rotation of the planetary gears 31 and 32 about their own axes, and relative movement between the sun gears 27 and 28. In the form illustrated, said means includes a motor 50 controlled by a suitable switch 51 and having its shaft connected to the shaft 43 through a speed reduction gearing 52, a coupling 53, and a suitable flexible coupling 54. The torque on the shaft 43 varies due to the eccentric or unbalanced action of the elliptical gears, and the flexible coupling includes springs 54a mounted between stops or shoulders on the two halves of the coupling, so as to absorb these variations and thus prevent their transmission to the gearing 52 and the motor, and also prevent any tendency of the shaft 43 to creep due to the lateral thrust on the pinion 42 in spite of the fact that the gearing 52 is of the irreversible type.

When it is desired to change the angular position of the two sets of elliptical gears, the motor 50 is operated to rotate the shaft 43 and bodily move the pinion 42 of the differential 36 at a predetermined speed to change the speed ratio of said differential, and correspondingly change the planetary speed of the planetary gears 31 and 32 with respect to the sun gear 27. This causes the planetary gears to rotate about their own axes so that the sun gear 28 will be accelerated or retarded with respect to the sun gear 27, thereby effecting the desired angular change in the two sets of elliptical gears. The locking differential is such that for every revolution of the planetary gears 31 and 32 about their own axes, the sun gear 28 will be continuously accelerated or decelerated with respect to the sun gear 27. When the desired angular change has been effected, the motor is stopped and the ring 35 will then again take the same speed as the sun gears 27, 28, and they will be locked together. The angular change will be slow and the amount will depend on the time that the motor is permitted to operate.

The operation of the variable speed transmission 17 and the operation of the means for changing the angular position between the two pairs of intermeshing elliptical gears may be effected simultaneously from a single control. For that purpose, there may be provided between the output shaft of the speed reduction gearing 52 and the control shaft 55 of the variable speed transmission 17, a transmission which, in the specific form shown, includes a gear 56 connected to the output shaft of said gearing 52, and meshing with a gear 57 fixed to a shaft 58. Gear 60 on the shaft 58 meshes with a gear 61 connected to a shaft 62, having a gear 63 meshing with a gear 64 connected to a shaft 65 which latter carries a gear 66 meshing with a gear 67 which in turn meshes with a gear 68 connected to a shaft 70. This shaft 70 drives the threaded control shaft 55 of the variable speed transmission 17 through a pair of bevel gears 73. Any other suitable mechanism may be employed for driving the shaft 55 at the desired speed in respect to that of the ring gear 35.

Since a single control member is provided for controlling the variable speed transmission and the adjustment of the elliptical gears, and since all equal increments of the control shaft 55 do not give equal speed changes, the transmission between the control shaft of the variable speed transmission 17 and the speed reduction gearing 52 includes compensating means to give the proper effect for each change in the speed ratio of the variable speed transmission. For that purpose, the transmission includes cam gears which are illustrated as the gears 63, 64.

In order to determine the adjustments to be made for cutting off sections of any desired length, there may be provided a dial 75 which is suitably indexed in accordance with the length of sheets desired, and which is driven from the shaft 70 by means of a chain drive 76.

For effecting the necessary adjustments, the motor 50 is operated until the dial 75 is rotated to the particular position which indicates the desired length of the sheet, and the switch 51 is then opened. The machine may be adjusted while in operation, and the frequency of operation of the cut-off and the speed variation in the cycle thereof will be both automatically adjusted at the same time. The means for adjusting the two elliptical gears in some machines may be made while the machine is running or while it is stationary.

By "differential" I mean a gearing in which one of the gears is bodily movable around other gears to change the speed ratio of the gearing.

Having thus described my invention, what I claim as new and desire to secure by Letters Patent is:—

1. An apparatus for subdividing continuously advancing sheet material transversely into sections, including a cut-off mechanism movable substantially in the same direction as the material at the instant of cutting, two pairs of intermeshing gears in series for continuously driving said cut-off at variable speeds, one of said pairs being elliptical, means for rotating one gear of each of said pairs in the same direction and the same angular velocity during normal operation of said cut-off mechanism, and means operable at will while the machine is running for angularly adjusting one of said gears in respect to the other.

2. An apparatus for subdividing continuously advancing sheet material transversely into sections, including a cut-off mechanism movable substantially in the same direction as the material at the instant of cutting, two pairs of intermeshing gears in series for continuously driving said cut-off at variable speeds, one of said pairs being elliptical, means for rotating one gear of each of said pairs in the same direction and the same angular velocity during normal operation of said cut-off mechanism, and a differential gearing operable at will while the machine is running for angularly adjusting one of said gears in respect to the other.

3. An apparatus for subdividing continuously advancing sheet material transversely into sections, including a cut-off mechanism movable substantially in the same direction as the material at the instant of cutting, and means for driving said cut-off mechanism, and including two pairs of intermeshing gears, one of said pairs being elliptical for driving said cut-off mechanism, means for rotating one gear of each of said pairs in the same direction and the same angular velocity during normal operation of said cut-off mechanism, a differential gearing having a sun gear and a planetary gear, for angularly adjusting one of said gears in respect to the other, and an electric motor operable at will for moving said planetary gear around said sun gear.

4. In combination, a cut-off mechanism, and driving means therefor, including a pair of intermeshing elliptical gears, a variable speed transmission, and a differential gearing for angularly adjusting said elliptical gears in respect to the driving means, said gearing including a pair of sun gears, and a planetary gear normally movable about the axes of said sun gears and at substantially the same angular velocity as one of said sun gears.

5. In combination, feeding means for the material to be cut, a drive therefor, a cut-off mechanism movable at the instant of cutting in the direction of the path of movement of said material, means for operating said cut-off from said drive, and including a variable speed transmission, two pairs of intermeshing elliptical gears arranged in series, and a differential gearing for driving one pair from the other, and for adjusting the angular position of one set of gears with respect to the other, said gearing including a pair of sun gears, and a planetary gear normally movable about the axes of said sun gears and at substantially the same angular velocity as one of said sun gears.

6. A cut-off mechanism having a pair of elliptical gears for driving the same, and a differential gearing for angularly adjusting said gears in respect to the cut-off mechanism, said gearing including a pair of sun gears, and a planetary gear normally movable about the axes of said sun gears and at substantially the same angular velocity as one of said sun gears.

7. In combination, a traveling cut-off, a drive shaft, and power transmittting connections between said drive shaft and said cut-off, including in series a variable speed transmission, a pair of elliptical gears, and a differential gearing connected to one of said gears, said gearing including a pair of sun gears, and a planetary gear normally movable about the axes of said sun gears and at substantially the same angular velocity as one of said sun gears, and means for varying the speed of said planetary gear to adjust the cut-off in respect to the drive shaft.

8. In a flying shear mechanism, in combination, a shear, a feeding device disposed to feed to the shear sheet material to be cut to predetermined lengths, and a transmission mechanism comprising a differential gear having three elements, one of which is disposed to actuate the shear, and the second element geared to the feeding device, and a differential for normally driving the third element around the axes of the first and second elements at substantially the angular speed of said first and second elements.

9. An apparatus for subdividing continuously advancing sheet material into a series of sections of uniform length, including a drive, a sheet feeding means driven thereby for advancing the sheet at a uniform speed, a cut-off mechanism, and driving connections between said drive and said mechanism, including a variable speed transmission for varying the frequency of operation of said cut-off in respect to the drive, two pairs of intermeshing elliptical gears, means for rotating an elliptical gear of each of said pairs in the same direction and at the same speed during normal operation of said drive shaft, and means operable at will while the machine is running, for angularly adjusting one of said last mentioned elliptical gears in respect to the other, and in accordance with adjustments of said variable speed transmission, to maintain the speed of the cut-off substantially the same as that of the sheet at the instant of cutting.

10. An apparatus for subdividing continuously advancing sheet material, including a drive shaft, a sheet feeding means driven thereby, a cut-off mechanism, and driving connections between said shaft and said mechanism, including a variable speed transmission for varying the time cycle of said cut-off mechanism in respect to said drive shaft, a pair of coaxial elements, one connected to said drive shaft and the other connected to said cut-off mechanism, a differential gearing having a pair of sun gears each rigidly connected to a corresponding one of said elements, a planetary gear and a carrier therefor, means for normally moving said carrier at a speed to prevent rotation of said planetary gear about its own axis, and thereby prevent relative rotation of said sun gears, and means operable at will while the machine is running for accelerating or decelerating the speed of the carrier to angularly adjust one element in respect to the other.

11. An apparatus for subdividing continuously advancing sheet material, including a drive shaft, a sheet feeding means driven thereby, a cut-off mechanism, and driving connections between said shaft and said mechanism, including a variable speed transmission for varying the time cycle of said cut-off mechanism in respect to said drive shaft, a pair of coaxial elements, one connected to said drive shaft and the other connected to said cut-off mechanism, a differential gearing having a pair of sun gears each rigidly connected to a corresponding one of said elements, a planetary gear and a carrier therefor, gearing connecting one of said elements and said carrier for normally moving said carrier at a speed to prevent rotation of said planetary gear about its own axis, and thereby prevent relative rotation of said sun gears, and means operable at will while the machine is running for accelerating or decelerating the speed of said carrier to angularly adjust one element in respect to the other.

12. An apparatus for subdividing continuously advancing sheet material, including a drive shaft, a sheet feeding means driven thereby, a cut-off mechanism, and driving connections between said shaft and said mechanism, including a variable speed transmission for varying the time cycle of said cut-off mechanism in respect to said drive shaft, a pair of coaxial elements, one connected to said drive shaft and the other connected to said cut-off mechanism, a differential gearing having a pair of sun gears each rigidly connected to a corresponding one of said elements, a planetary gear and a carrier therefor, gearing including a bodily movable gear connecting one of said elements and said carrier for normally moving said carrier at a speed to prevent rotation of said planetary gear about its own axis, and thereby prevent relative rotation of said sun gears, and means operable at will while the machine is running for moving said bodily movable gear to accelerate or decelerate the speed of said carrier to angularly adjust one element in respect to the other.

13. An apparatus for subdividing continuously advancing sheet material into a series of sections of uniform length, including a drive shaft, a sheet feeding means driven thereby for advancing the sheet at a uniform speed, a cut-off mechanism and driving connections between said shaft and said mechanism, including a variable speed transmission for varying the frequency of operation of said cut-off in respect to the drive shaft, a pair of coaxial elements, one connected to said drive shaft and the other to said cut-off mechanism, a differential gearing, means for rotating said elements in the same direction and at the same speed during normal operations of said drive shaft, and while said differential gearing is operating at a predetermined speed ratio, means operable at will while the machine is running, for varying the speed ratio of said differential gearing, and means for angularly adjusting said elements upon changes in the speed ratio of said differential gearing.

14. An apparatus for subdividing continuously advancing sheet material into a series of sections of uniform length, including a drive shaft, a sheet feeding means driven thereby for advancing the sheet at a uniform speed, a cut-off mechanism, and driving connections between said shaft and said mechanism, including a variable speed transmission for varying the frequency of operation of said cut-off in respect to the drive shaft, a pair of coaxial elements, one connected to said drive shaft and the other to said cut-off mechanism, a differential gearing, means for rotating said elements in the same direction and at the same speed during normal operation of said drive shaft, and while the axis of the bodily movable gear of said differential gearing is stationary, means operable at will while the machine is running, for moving the axis of said last mentioned gear to change the speed ratio of said differential gearing, and means for angularly adjusting said elements upon changes in the speed ratio of said differential gearing.

15. An apparatus for subdividing continuously advancing sheet material into a series of sections of uniform length, including a drive shaft, a sheet feeding means driven thereby for advancing the sheet at a uniform speed, a cut-off mechanism, and driving connections between said shaft and said mechanism, including a variable speed transmission for varying the frequency of operation of said cut-off in respect to the drive shaft, a pair of coaxial elements, one connected to said drive shaft and the other to said cut-off mechanism, a first differential gearing between said elements, a second differential gearing, means for operating said first differential gearing at a speed ratio of unity when said second differential gearing is operating at the same speed ratio, whereby said elements are driven at the same speed, and means operable at will while the machine is running, for varying the speed ratio of said second differential gearing and thereby change the speed ratio of said first differential gearing, whereby the angular relationship of said elements is adjusted.

16. An apparatus for subdividing continuously advancing sheet material into a series of sections of uniform length, including a drive shaft, a sheet feeding means driven from said drive shaft, a cut-off mechanism, and driving connections between said shaft and said mechanism, including a variable speed transmission for varying the frequency of operation of said cut-off mechanism in respect to said drive shaft to control the length of said sections, a pair of intermeshing elliptical gears having their normal cycles of operation coincident with that of the cut-off mechanism, a first differential gearing in series with said pair of elliptical gears, and means including a second differential gearing for normally driving said first differential gearing at a speed ratio of unity, whereby said pair of elliptical gears are maintained at a fixed angular relationship with said driving shaft during normal operation, and means for varying the speed ratio of said second differential gearing to effect a change in the speed ratio of said first differential and a change in the angular relationship of said elliptical gears with respect to said drive shaft.

17. An apparatus for subdividing continuously advancing sheet material into a series of sections of uniform length, including a drive, a sheet feeding means driven thereby for advancing the sheet at a uniform speed, a cut-off mechanism, and driving connections between said drive and said mechanism, including a variable speed transmission for varying the frequency of operation of said cut-off in respect to the drive, a pair of sun gears mounted coaxially, a pair of planetary pinions connected for rotation together about a common axis parallel to the axes of said sun gears, and meshing respectively with said sun gears, the gear ratio between one planetary pinion and its sun gear being slightly different from that of the other pinion and its sun gear, means for driving said planetary pinions bodily about the axes of said sun gears at an angular velocity equal to the angular velocity of one of said sun gears, whereby both sun gears are normally driven at the same angular speed, and means for varying the relative angular velocity of said planetary pinions and said sun gears about said axis to vary the angular relationship of said sun gears.

18. An apparatus for subdividing continuously advancing sheet material into a series of sections of uniform length, including a drive shaft, a sheet feeding means driven from said drive shaft, a cut-off mechanism, and driving connections between said shaft and said mechanism, including a variable speed transmission for varying the frequency of operation of said cut-off mechanism in respect to said shaft, to control the length of said sections, a differential comprising a first pair of relatively rotatable coaxial gears, a second pair of rigidly connected coaxial gears meshing respectively with said first pair of gears and rotatable together about their own axes, the gear ratios of the two sets of intermeshing gears being different, means for driving said second pair of gears bodily about said first pair at the same angular velocity as one of the gears of said first pair, whereby the gears of said first pair are locked together, and means for varying the angular velocity of said second pair of gears in respect to said first pair of gears about the axes of the first pair to vary the angular relationship or speed of the gears of said first pair.

19. An apparatus for subdividing continuously advancing sheet material, including a drive shaft, a sheet feeding means driven thereby, a cut-off mechanism having a driven shaft, and driving connections between said shafts, including a variable speed transmission for varying the frequency of operation of said cut-off mechanism in respect to said drive shaft to control the length of said sections, a pair of intermeshing elliptical gears having their cycles of operation coincident with that of one of said shafts, a differential gearing including a pair of sun gears and a planetary gear connected in series with said elliptical gears, power transmission means between said planetary gear and said drive shaft for moving said planetary gear at the same angular velocity as said drive shaft, and including a second differential gearing, and means for varying the speed ratio of said latter gearing to effect variations in the speed ratio of said first mentioned differential gearing, and thereby effect adjustments in the angular relationship of said elliptical gears with respect to the other shaft.

20. An apparatus for subdividing continuously advancing sheet material into a series of sections of uniform length, including a drive, a sheet feeding means driven thereby for advancing the sheet at a uniform speed, a cut-off mechanism, and driving connections between said drive and said mechanism, including a variable speed transmission for varying the frequency of operation of said cut-off in respect to the drive, a pair of coaxial elliptical gears, a pair of spur gears rigid with said elliptical gears respectively, a planetary gear having two sets of teeth meshing respectively with said spur gears, the gear ratios of said planetary gear and said spur gears being different, means for moving said planetary gear bodily about the axes of said spur gears at an angular velocity equal to the angular velocity of one of said spur gears, whereby the two spur gears are driven at the same angular speed, and means for varying the body movement of said planetary gear to effect relative angular movement between said spur gears.

21. An apparatus for subdividing continuously advancing sheet material, including a drive shaft, a sheet feeding means driven thereby, a cut-off mechanism, and driving connections between said shaft and said mechanism, including a variable speed transmission for varying the frequency of operation of said cut-off mechanism in respect to said drive shaft to control the length of said sections, two pairs of intermeshing elliptical gears connected in series, with one gear of one pair mounted coaxially with one gear of the other pair, a pair of spur gears connected respectively for rotation with said axially aligned elliptical gears, and having a slightly different number of teeth, a planetary gear wheel having two sets of teeth meshing respectively with said spur gears, a driving connection between said drive shaft and said planetary gear wheel for moving said planetary gear wheel about the axes of said spur gears at an angular velocity equal to the angular velocity of one of said spur gears, whereby the two spur gears are driven at the same angular speed, and including a differential gearing having sun gears and a planetary gear, and means for bodily moving the last mentioned planetary gear to vary the speed ratio of said differential gearing, and thereby vary the rate of movement of said first mentioned planetary gear wheel about the axes of said spur gears to change the angular position of one pair of elliptical gears with respect to the other.

KARL SIEG.